(12) United States Patent
Sallas

(10) Patent No.: US 11,693,136 B2
(45) Date of Patent: Jul. 4, 2023

(54) SEISMIC VIBRATOR WITH ADJUSTABLE RESONANCE FREQUENCY

(71) Applicant: SERCEL, Carquefou (FR)

(72) Inventor: John J. Sallas, Plano, TX (US)

(73) Assignee: SERCEL, Carquefou (FR)

( * ) Notice: Subject to any disclaimer, the term of this patent is extended or adjusted under 35 U.S.C. 154(b) by 416 days.

(21) Appl. No.: 16/833,902

(22) Filed: Mar. 30, 2020

(65) Prior Publication Data

US 2021/0132242 A1  May 6, 2021

Related U.S. Application Data

(60) Provisional application No. 62/928,757, filed on Oct. 31, 2019.

(51) Int. Cl.
*G01V 1/00* (2006.01)
*G01V 1/135* (2006.01)
*G01V 1/155* (2006.01)

(52) U.S. Cl.
CPC .............. *G01V 1/005* (2013.01); *G01V 1/135* (2013.01); *G01V 1/155* (2013.01)

(58) Field of Classification Search
None
See application file for complete search history.

(56) References Cited

U.S. PATENT DOCUMENTS

| | | | |
|---|---|---|---|
| 759,872 A * | 5/1904 | Evans | |
| 3,373,841 A * | 3/1968 | Miller, Jr. | G01V 1/155 181/119 |
| 8,274,862 B2 | 9/2012 | Sallas | |
| 2007/0240930 A1* | 10/2007 | Wei | G01V 1/143 181/121 |
| 2011/0085416 A1* | 4/2011 | Sallas | G01V 1/133 367/143 |
| 2016/0313461 A1* | 10/2016 | Sallas | G01V 1/003 |
| 2017/0168174 A1* | 6/2017 | Dowle | G01V 1/38 |

OTHER PUBLICATIONS

Kiledjian, "Oscillations of Pulley with Spring and Weight: Example", https://www.youtube.com/watch?v=AawUt0pboSc (Year: 2007).*

* cited by examiner

*Primary Examiner* — Isam A Alsomiri
*Assistant Examiner* — Joseph C Fritchman
(74) *Attorney, Agent, or Firm* — Patent Portfolio Builders PLLC

(57) ABSTRACT

A seismic vibrator is configured to operate close to resonance for range of actuating frequencies. The vibrator has a baseplate, a reaction mass coupled to the baseplate via an elastic coupling mechanism and an actuator configured to displace the reaction mass with an actuating frequency. The vibrator also has a frequency-adjusting system configured to adjust a natural frequency of the elastic coupling mechanism and the reaction mass, to track the actuating frequency so that to achieve resonance.

18 Claims, 10 Drawing Sheets

SEISMIC VIBRATOR WITH ADJUSTABLE RESONANCE FREQUENCY

BACKGROUND

Technical Field

Embodiments of the subject matter disclosed herein generally relate to a seismic vibrator and, more particularly, to a seismic vibrator with a frequency-adjusting system configured to adjust a natural frequency of an elastic coupling mechanism and a reaction mass coupled to a baseplate of the vibrator.

Discussion of the Background

Seismic exploration of an underground formation (on land or under the sea floor) refers to measuring travel times and amplitudes of seismic excitations emerging from the explored formation. These measurements recorded as seismic data by receivers enable evaluating the location of reflective interfaces inside the explored formation, as well as velocity, reflection coefficients, attenuation, etc. Seismic data is processed to yield a profile (sometimes called an "image," but not necessarily 2D) of the explored underground formation's structure. Those trained in the field evaluate the likelihood of the presence and location of oil and gas reservoirs or other minerals of interest based on this profile. Therefore, obtaining high-resolution images of underground formations from seismic data is of continued interest.

A schematic diagram of a land seismic data acquisition system 100 is illustrated in FIG. 1. System 100 includes receivers 102 placed in an area 104 of surface 106 over the explored subsurface formation. One or more seismic sources 108 (e.g., vibrators) placed in an area 110 of the surface 106 inject seismic excitations into the explored underground formation. The receivers and sources may also be buried under the surface 106. Areas 104 and 110 may overlap or even coincide. A recording device 112 connected by wire or wireless to the receivers 102 may be remote or carried at the land survey site in a towed trailer, recording truck or other vehicle 114. Each source 108 can be also be carried by a truck (as suggested in the figure) and may include plural vibrators (typically between one and five) and a local source controller 116. A central controller 118 may be in communication with the local source controllers to coordinate the activation times of sources 108. A global positioning system (GPS) 120 may assist in placement of the sources at planned locations, provide times to coordinate the source activation, and/or provide information useful for managing the transfer of seismic data recorded by receivers to the recording device. Acquiring data in a predefined area using data acquisition system 100 is known as a seismic survey.

A frequency of seismic excitations useful for seismic exploration is typically up to 100 Hz. In areas with complex geology, good velocity models are needed to properly image subterranean structures. Seismic data processing methods like full waveform inversion (FWI) provides a means to develop useful velocity models. FWI methods are prone to model convergence problems. FWI velocity modeling frequently starts with analyzing very low-frequency data (at about 1 Hz) to avoid some data processing issues such as cycle skipping. A model obtained using low-frequency data is used as starting point in subsequent data analysis iterations that gradually (in steps that may be as low as 0.5 Hz) add seismic data at higher frequencies to refine the velocity model. Data acquired at long offsets that produce useful diving waves with good low frequency content seem to provide a useful starting point for FWI methods. Conventional vibrators, typically designed to operate in a 5-100 Hz range, are hard to adapt to generate lower frequencies because the lower the frequency, the longer it takes to emit a given amount of energy, the energy radiated being proportional to the frequency squared. So even if a conventional vibrator was not stroke- or flow-limited and could maintain a frequency invariant ground force amplitude, the vibrator has to operate 25 times longer at 1 Hz than at 5 Hz to achieve the same total energy output.

The signals used to acquire seismic data may have a continuously varying frequency (known as a "sweep" and described, for example, in U.S. Pat. No. 8,274,862) or a sequence of discrete frequency signals. If the data is acquired while the vibrator operates according to the sweep, the data set may be split into frequency bands, increasingly higher frequency bands being gradually fed to an FWI processing engine.

Operating conventional vibrators according to low-dwell sweeps (i.e., sweeps covering the range of 1-100 Hz while obtaining enough low-frequency data) is not that efficient for at least the following two reasons. First, the spatial sampling for the very low frequencies (e.g., less than 5 Hz) does not need the same density as for higher frequencies. Second, in order to acquire enough data at low frequencies, the conventional vibrators have to spend most of the dwelling time at these low frequencies where the energy efficiency is quite low.

Providing data sets that include diving waves produced at long offsets that are useful for FWI model building is challenging because the vibrators have to be offset from the receivers by more than four times the depth of interest in order to recover useful diving waves. For example, if the depth of interest is 3,000 m, then vibrators would be offset about 12,000 m from the receiver. At these long offsets, the high frequency signals are strongly attenuated by earth absorption, so only low frequency signals are recovered. But at long offsets, low-signal-to-noise issues occur even at low frequency. Due to long offsets, the useful (i.e., structural information carrying) low frequency signals can be very weak and, the environmental and receiver noise floor is larger than for signals with higher frequencies. A strong, efficient low-frequency source is desirable for this type of long offset data acquisition.

Thus, there is a need for a seismic vibrator that efficiently generates low-frequency seismic waves to be injected into underground formations during seismic surveys.

BRIEF SUMMARY OF THE INVENTION

According to an embodiment, there is a seismic vibrator that is configured to operate close to resonance for range of actuating frequencies. The seismic vibrator has a baseplate, a reaction mass coupled to the baseplate via an elastic coupling mechanism, an actuator configured to displace the reaction mass with an actuating frequency and a frequency-adjusting system. The frequency-adjusting system is configured to adjust a natural frequency of the elastic coupling mechanism and the reaction mass, to track the actuating frequency so that to achieve resonance.

According to another embodiment, there is a frequency-adjusting system configured to adjust a natural frequency of an elastic coupling mechanism and a reaction mass. The elastic coupling mechanism includes a including a top chamber and a bottom chamber formed inside a cavity of the reaction mass, the top chamber being separated by the bottom chamber by a piston. The frequency-adjusting system includes a controller configured to calculate pressures and gas volume values of the top chamber and of the bottom chamber, the calculated pressures and gas volume values corresponding to target values needed to realize a desired natural frequency. The frequency-adjusting system further includes accumulators and valves receiving commands from the controller to achieve parameter values for the pressures and the gas volumes in communication with the top chamber and the bottom chamber. The controller outputs the commands causing instantaneous pressures and volumes of the top chamber and of the bottom chamber to achieve the calculated pressure and volume values. The desired natural frequency is substantially equal to an actuation frequency applied to the reaction mass thereby achieving resonance.

According to yet another embodiment, there is a method of operating a vibrator having a reaction mass attached to a baseplate via an elastic coupling mechanism. The method includes obtaining an actuating frequency versus time profile, and calculating values of one or more parameters determining a natural frequency of the elastic coupling mechanism and the reaction mass so that the natural frequency matches frequency values of the actuating frequency in the actuating frequency versus time profile. The method further includes adjusting the one or more parameters using the calculated values while the reaction mass is actuated according to the actuating frequency versus time profile.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
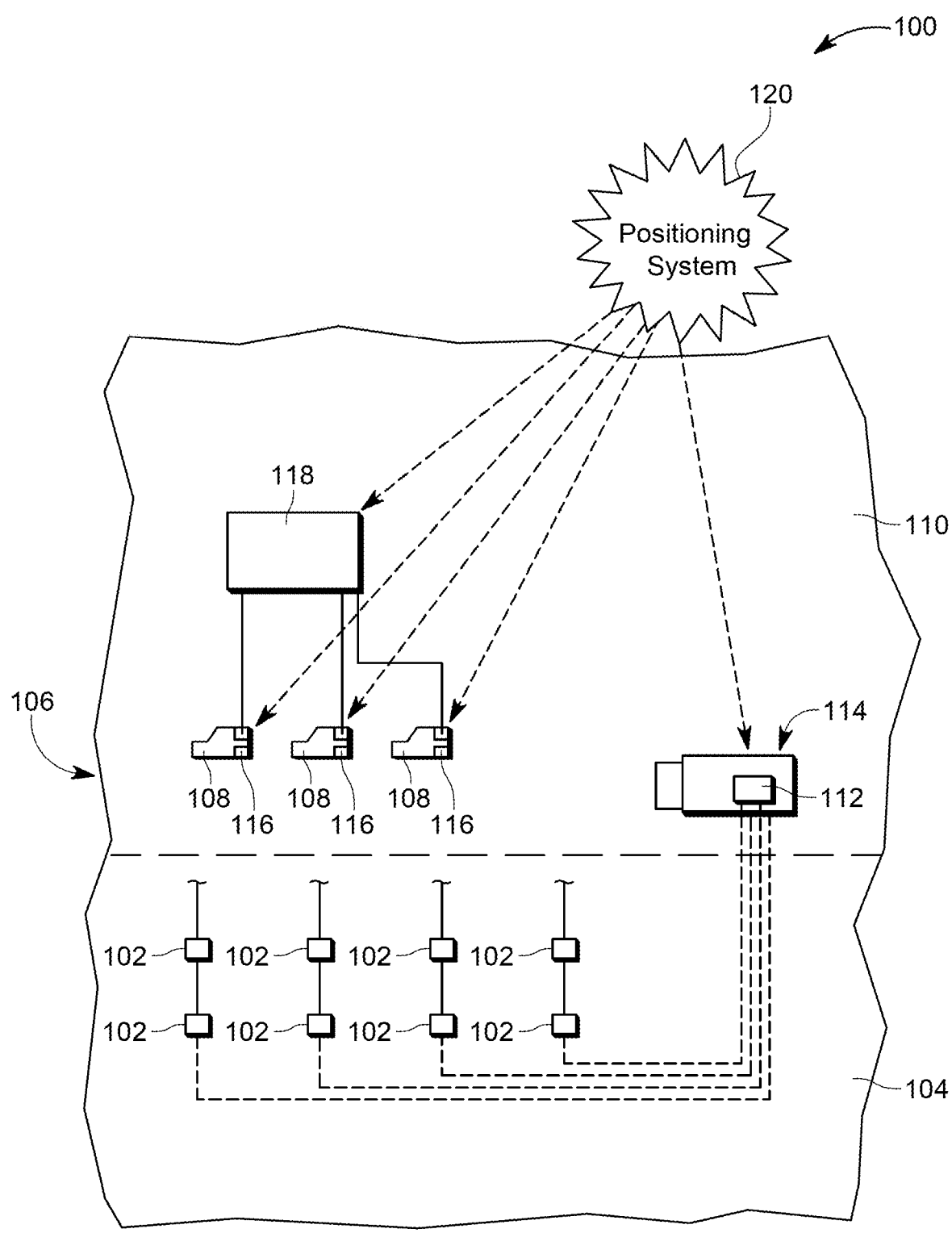
FIG. 1 is a schematic illustration of a land seismic data acquisition system.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity (but without intent to limit its applicability), with regard to a land vibrator with a single reaction mass attached to a baseplate. However, the invention can be applied to more than one reaction mass, or to other sources that employ a reaction mass for generating one or more frequencies.

Reference throughout the specification to "one embodiment" or "an embodiment" means that a particular feature, structure or characteristic described in connection with an embodiment is included in at least one embodiment of the subject matter disclosed. Thus, the phrases "in one embodiment" or "in an embodiment" in various places throughout the specification are not necessarily referring to the same embodiment. Further, the particular features, structures or characteristics may be combined in any suitable manner in one or more embodiments.

One way to achieve a good energy transfer efficiency in vibrators is to operate them at or near their resonance to optimize an energy transfer from an actuation mechanism to a vibration mechanism. Good energy transfer efficiency is of particular importance at low frequencies (i.e., less than 5 Hz), where supplying enough energy is challenging. Resonance is achieved when the natural frequency of an elastic coupling mechanism and a reaction mass substantially matches the actuation frequency of the reaction mass. The embodiments described in this section include frequency-adjusting systems that change the natural frequency of the elastic coupling mechanism and the reaction mass. The vibrators may operate at discrete frequencies or according to a continuously varying frequency versus time profile (i.e., "sweeps"). During a sweep, as the actuation frequency follows a frequency versus time profile, the frequency-adjusting systems changes parameter values of parameters that determine the natural frequency of the elastic coupling mechanism and the reaction mass so that the natural frequency tracks the same profile, and thus, the vibrator operates at resonance (or very close to resonance given the dynamic of the entire operation) over the sweep frequency range of interest. Here, "very close" is to be understood e.g. as a resonance of about ±10% of the resonance, preferably ±5%.

An elastic coupling mechanism tends to maintain an equilibrium position of an object (such as a reaction mass) of mass m attached to the elastic coupling mechanism. When the object is displaced away from its equilibrium position, the elastic coupling mechanism generates an elastic restoring force $F_s$ opposite to and proportional with the displacement x: $F_s=-kx$ where k is known as spring rate. The word "spring" here does not require the elastic coupling mechanism to employ a spring. Absent external forces (e.g., from an actuator), the object oscillates around the equilibrium position with the natural frequency ($F_n$) in Hz as: $F_n=(1/2\pi)\sqrt{k/m}$. However, the object may be forced (e.g., by an actuator) to oscillate at another frequency (e.g., an actuator frequency) that is different from its natural frequency.

Significantly less energy is necessary to operate the vibrator over a long time interval if the natural frequency of the elastic coupling mechanism and the reaction mass is substantially equal to the actuator's frequency (assuming here also that the energy loss, for example friction, is low, significantly smaller than the energy for actuating the reaction mass at a frequency away from resonance). Here, "substantially equal" means as close as it can be achieved and maintained. For example, the amount of total energy for generating a 100-second emission for a vibrator operating at resonance may be about the same as that for a 10-second emission otherwise (i.e., not operating at resonance).

If less power is required to generate and/or sustain low frequency vibrations, the vibrator's power pack necessary to produce the actuating energy can be (or remain) smaller. A smaller power pack generates less noise and heat. Exploiting the resonance at low frequencies allows using engines, pumps and valves currently employed in vibrators without having to add or replace them with larger, more expensive components. Additionally, at resonance, the harmonic distortion of vibrations injected in the explored underground formation tends to be greatly reduced.

The variable resonance vibrators (VRV) described in this section include hardware (i.e., a frequency-adjusting system, "FAS") configured to adjust the natural frequency of the elastic coupling mechanism and the reaction mass so that the natural frequency is close to the actuation frequency and tracks the actuation frequency's evolution at least for a range of the actuating frequencies. Conventional vibrators are designed for a vibration frequency range of 5-100 Hz and typically have airbags between the reaction mass and baseplate to help provide a centering force to overcome the force of gravity acting on the reaction mass. This produces a single (fixed) natural frequency of the elastic coupling mechanism and the reaction mass, but its natural frequency typically falls outside the sweep range. For conventional vibrators, a second resonance can occur at higher frequencies that is dependent upon the earth stiffness and trapped interior oil volume of the mass chambers, but this earth coupling resonance typically occurs above 15 Hz and on hard surfaces like ice up to 60 Hz. The ability to change the natural frequency enables the VRVs to operate more efficiently at frequencies lower than 5 Hz (for example, down to 1 Hz, or even lower). This description adopts a simplifying (but non-limiting and generally accurate) assumption that for the low frequencies of interest the reaction mass moves much more than the baseplate and that the earth has a much higher stiffness than the elastic coupling mechanism of the VRV. Noticeable departures from this assumption occur in case of soft earth surfaces and may be observed via sensor measurements. However, a feedback loop enables secondary adjustments of the natural frequency to compensate for such departures or other deviations from resonance.

Figure 2:
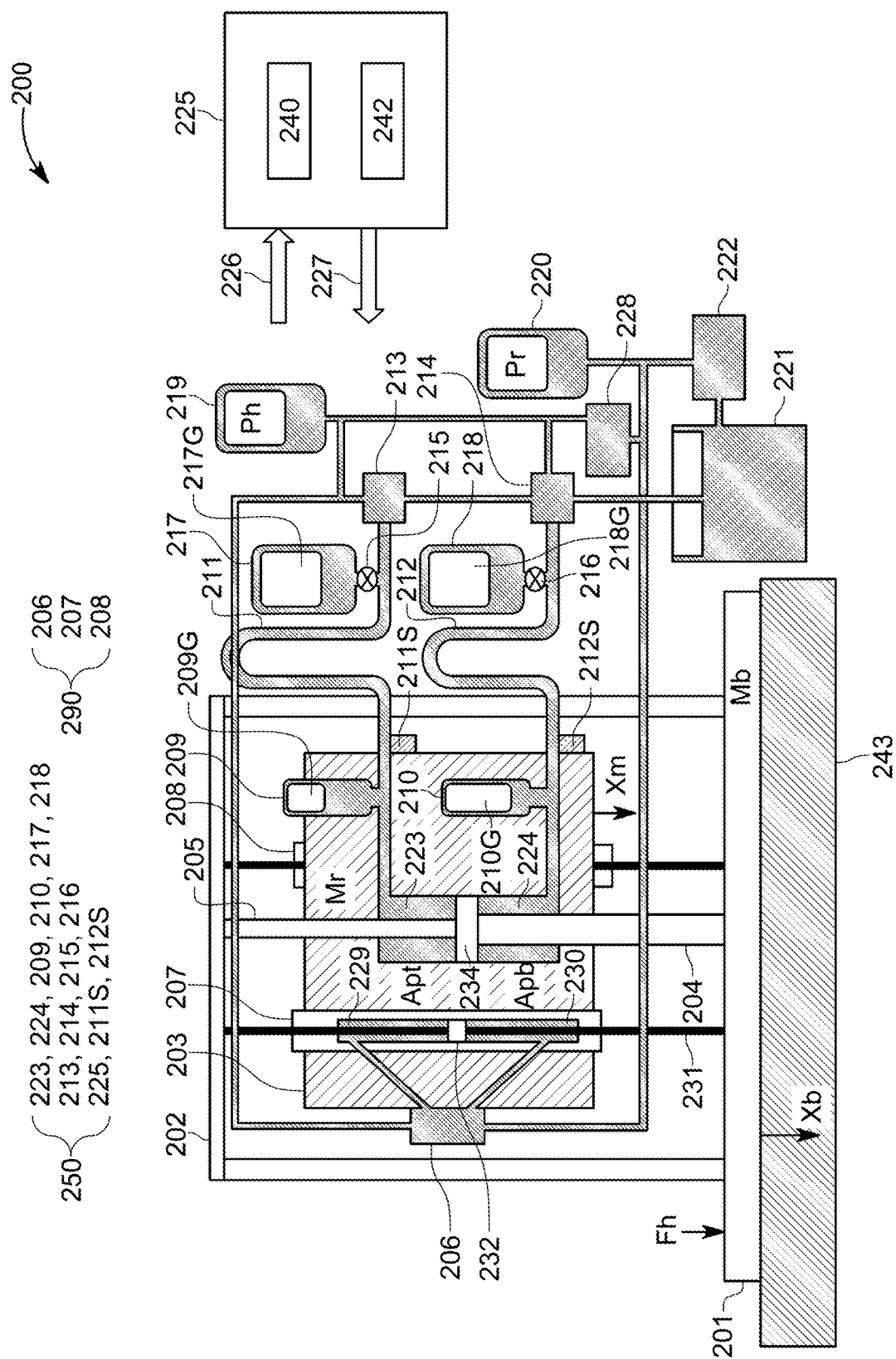
FIG. 2 is a schematic diagram of a variable resonance vibrator (hereinafter "VRV") according to an embodiment.

Various VRV embodiments are now described with regard to FIGS. 2 & 12-14. FIG. 2 shows a VRV 200 having a baseplate 201 that is the part of a driven structure 202 where Mb represents the mass of the driven structure. Baseplate 201 is in contact with the surface of the earth 243. A static hold-down force $F_n$ may be applied to baseplate 201 for maintaining good contact with the earth surface while a dynamic oscillatory force is applied by an actuator in combination with an elastic coupling mechanism. For example, the VRV may be mounted on a truck equipped with a hydraulic lift system that applies the force $F_n$ (which may be a portion of the truck's weight) through some form of vibrational isolator (such as airbags) to protect the truck while the vibrator is operated. The earth's radiation impedance effect on the baseplate is equivalent to a spring and a dashpot there-between.

A reaction mass 203 of mass $M_r$ (e.g., about 6,000 kg for some vibratory trucks) is actuated up and down (as suggested by arrow marked $x_m$) to generate vibrations (suggested by arrow marked $x_b$) into the explored underground formation. The reaction mass's actuator may be an electric linear actuator, a hydraulic actuator, a pneumatic actuator, etc. FIG. 2 illustrates a hydraulic actuator 290 including two hydraulic cylinders 207 and 208 receiving fluid via the same valve 206 to provide the actuating force applied to the reaction mass 203; alternatively, as explained below, the valve 206 could be replaced by two valves or other solutions. Using more than one hydraulic cylinder is advantageous to avoid a force imbalance that might cause the reaction mass to wobble or get in a bind as it slides up and down. However, a single cylinder may suffice. The cylindrical shape is convenient, but not necessary (e.g., a prism with any polygonal base would work as well). Cylinders 207 and 208 may be located inside mass 203 or fixedly attached thereto.

Describing now a single actuator, a piston rod 231 attached to driven structure 202 passes through bore of the 207. The piston rod is equipped with seals and bearings not shown. A piston 232 mounted on piston rod 231 divides the bore into an upper chamber 229 and a lower chamber 230. A 4-way servo-valve 206 (e.g., a spool valve) has a supply port connected to high-pressure $P_h$ and a return port connected to return pressure $P_r$. Valve 206 has one working port connected to upper chamber 229 and the other working port connected to lower chamber 230. Alternatively, servo-valve 206 could be replaced by two three-ways valves. When servo-valve 206 is in a positive position, fluid enters the upper chamber and exits the lower chamber. When servo-valve 206 is in a negative position, the flow direction is reversed. As the servo-valve switches back and forth between the negative position and the positive position, it creates a differential pressure between chambers 229 and 230. This differential pressure causes an alternating excitation force that moves the reaction mass 203 up and down with a displacement $x_m$ from its equilibrium position. The frequency of switching the flow is the actuation frequency and this can follow a planned sweep.

The upper chamber 229 is in fluid communication with an upper chamber of cylinder 208 (not shown). The lower chambers of both cylinder 207 and 208 are also in fluid communication (not shown). Servo-valve 206 operates both hydraulic actuators 207 and 208.

VRV 200 has a frequency-adjusting system, FAS, 250 configured to adjust a natural frequency of the elastic coupling mechanism and the reaction mass. The elastic coupling mechanism may include a piston rod with an upper portion 205 and a lower portion 204 passes through a central bore of the reaction mass. A piston 234 on this piston rod separates an upper chamber 223 and a lower chamber 224 inside the bore. These elements may also be part of the elastic coupling mechanism. In another embodiment, a first upper rod 205 and a second lower rod 204 are connected to opposite side of the piston 234. The upper and lower portions of the piston rod exit the reaction mass 203 through respective upper and lower bearing and seal assemblies (not shown), to be attached to the driven structure 202 (that includes baseplate 201). Upper portion 205 and lower portion 204 may have different diameters, so the effective piston top area $A_{pt}$ of upper chamber 229 is larger the effective piston bottom area $A_{pb}$ of lower chamber 230. The effective piston areas for the respective chambers is merely the difference between the chamber bore area and the corresponding rod cross-sectional area.

A top gas spring is formed by the chamber 223 that is in fluid communication with hydraulic accumulator 209 and if in fluid communication with accumulator 217 as well. A bottom gas spring is formed by the chamber 224 that is in fluid communication with hydraulic accumulator 210 and if in fluid communication with accumulator 218 as well.

Hydraulic accumulators 209, 210, 217 and 218 contain a gas (typically dry nitrogen) whose volume is represented by 209G, 210G, 217G and 218G respectively. The hydraulic accumulators may all be piston accumulators, but other types are possible, for example, bladder or diaphragm types. The top gas spring and the bottom gas spring form the elastic coupling mechanism that couples the reaction mass 203 to the baseplate 201. For a piston accumulator, a gas spring uses compressed gas in an enclosed cavity (e.g., cylinder but not limited or determined by a circular cross-section) sealed by a sliding accumulator piston (not shown) to store potential energy and oppose an external force applied perpendicular to the piston. (For other types of accumulators, instead of a sliding piston you might have a gas filled bladder housed within the accumulator metal against whose walls the fluid acts to compress or expand the encapsulate gas volume.) Spring rates $K_{tair}$ and $K_{bair}$ associated with the top and bottom gas spring are proportionality factors of the respective gas spring's force opposing piston's (234) displacement inside the bore. In fact, the reaction mass is displaced due to actuation and therefore the bore moves relative to the fixed piston (assuming the earth surface is stationary).

The elastic coupling mechanism includes the chambers 223 and 224 and components in continuous or intermittent fluid communication with them (FAS 250). FAS 250 includes fluid containing accumulators 209, 210, 217, and 218 connected to the chambers and to the fluid accumulator reservoirs 219 and 220 via fluid passageways like pipes or hoses 211 and 212, and valves 213-216. The FAS 250 may also include a controller 225, as discussed later.

As illustrated in FIG. 2, a first internal accumulator 209 may be mounted inside reaction mass 203. Upper chamber 223 may be permanently in fluid communication with accumulator 209 as illustrated in FIG. 2 or via an internal passageway or via hose 211. A second external accumulator 217 is also connected to chamber 223 through hose 211 (and it is in fluid communication if valve 215 is open). Because FIG. 2 is a simplified diagram of the VRV, it illustrates only representative components thereof employed in the described functionality. For example, the VRV's hydraulic circuit may include oil coolers, working fluid particle filters and valves, which are not shown in FIG. 2. For simplicity, a single upper hose 211 and a single lower hose 212 are illustrated although multiple hoses may be required to keep the fluid velocity below a desired value (e.g., about 10 m/s) since fluid exchange flows between fluid accumulators and the chambers can be large. The upper hose 211 and lower hose 212 connect the gas accumulators to the upper and lower chambers (223 and 224) inside reaction mass 203. The working fluid may be a petroleum-based product.

Figure 12:
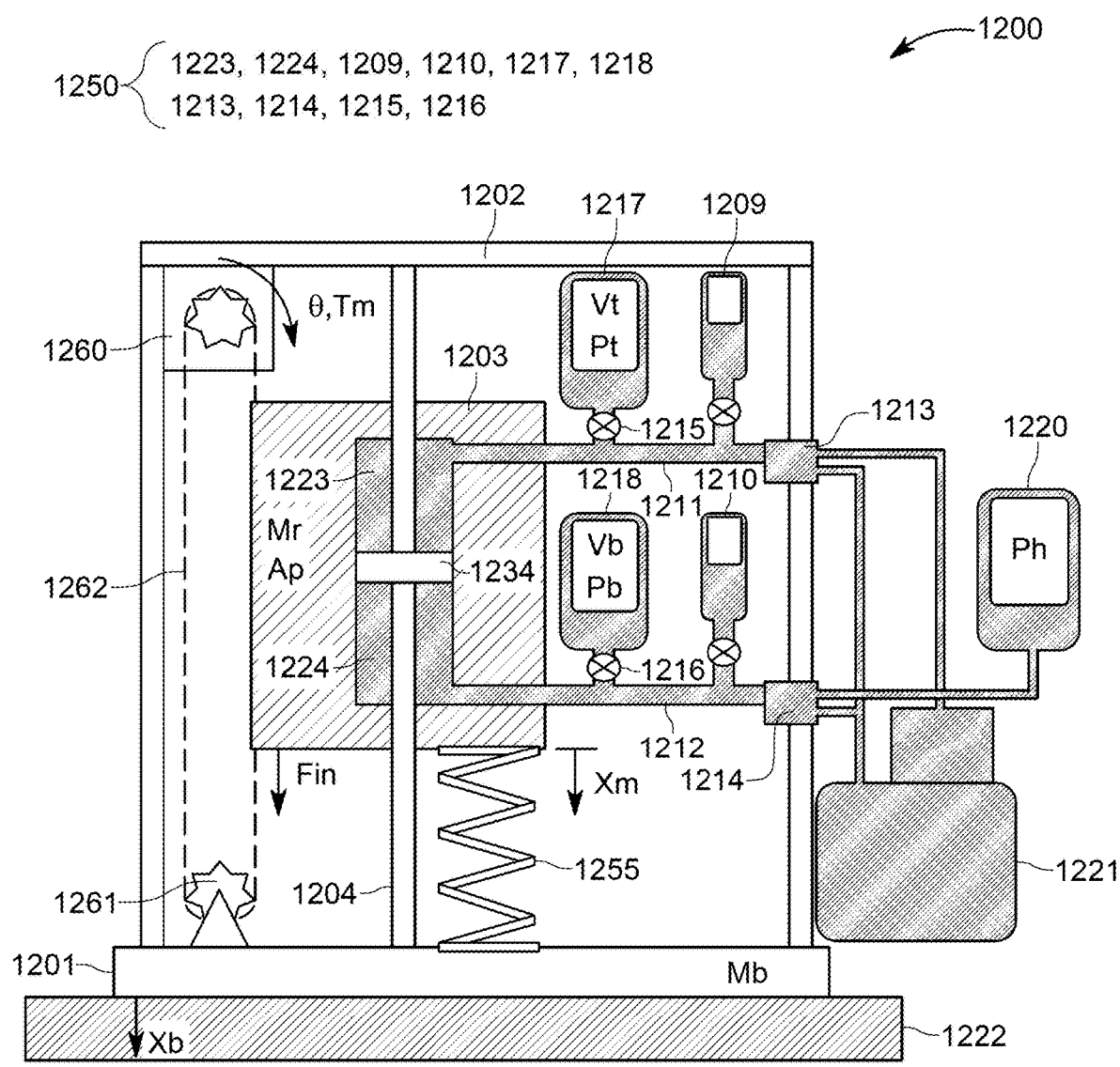
FIG. 12 is a VRV according to another embodiment.

Accumulator 209 contains a volume of gas, as dry nitrogen, 209G at a pre-charge pressure Po and may be located within the reaction mass as in FIG. 2 or outside as in FIG. 12. The second larger accumulator 217 may be located separately from the accumulator 209 and the reaction mass 203 (for example, on the truck bed). Accumulator 217 contains both gas 217G and fluid. A first motorized valve 215 can be controlled to allow, or not, fluid communication between the accumulator 217 and the top chamber 223. A first 3-way servo-valve 213 enables receiving or removing fluid from the accumulator 209 and if enabled 217, thereby adjusting the average operating pressure used to operate the upper gas spring. Valve 213 is in communication with high-pressure fluid supply 219 and with low-pressure reservoir 221 in which fluid may be received.

High-pressure pump 228 may be a variable displacement pressure regulated pump driven by a diesel engine (not shown). High-pressure pump 228 outputs a high-pressure $P_h$ to a hydraulic gas accumulator 219 to help reduce pressure transients as flow demand changes. Low-pressure pump 222 is used to maintain a pressure $P_r$ (e.g., 5% of $P_h$) to pump 228 and return pressure accumulator 220 (used to reduce any pressure transients and other hydraulic components to prevent cavitation). Low-pressure pump 222 may draw fluid from the fluid reservoir 221.

In FIG. 2, the lower chamber 224 is in fluid communication with a third accumulator 210, which (similar to accumulator 209) contains a volume of dry nitrogen 210G at a pre-charge pressure Po. Accumulator 210 may also be located within the reaction mass 203. Similar to accumulator, 217, a fourth larger accumulator 218 may be located as illustrated in FIG. 2 separately from accumulator 210 and the reaction mass 203 (for example, on the truck bed). A second motorized valve 216 can be controlled to allow, or not, fluid communication between accumulator 218 and chamber 224. A second 3-way servo-valve 214 enables adjusting the average operating pressure used to operate the lower gas spring. Servo-valve 214 is also connected to the high-pressure fluid supply 219 and to low-pressure reservoir 221.

The spring rate K of a gas spring is a function of the total volume of gas (i.e., chamber's volume and the volumes of the accumulators in fluid communication with the chamber), the gas pressure therein and an effective piston area in the chamber. Since the top and the bottom gas springs operate in parallel, their equivalent spring rate is the sum of their individual spring rates. The controller 225, which may receive information 226 (e.g., from one or more pressure sensors 211s and 212s) is configured to calculate volume and pressure values for obtaining a natural frequency equal to the actuation frequency, thus, achieving resonance. Controller 225 might be numeric, mechanic, hydraulic, pneumatic or a combination thereof. Controller 225 then send control signals 227 to the valves (i.e., 213-216 in FIG. 2) to control the volumes and pressures of the gas springs so that the natural frequency tracks the actuation frequency. For example, if valve 213 allows pump 228 to inject high-pressure fluid into accumulator 217 (assuming valve 215 is open), then the gas volume decreases and the gas pressure increases, making the upper chamber gas spring rate to increase. If the upper chamber spring rate is to be decreased, then valve 213 is opened to release fluid into the reservoir 221, so the gas volume increases and the gas pressure decreases. Note that the controller may also control the actuators, and can be adapted to work with input from other sensors, like e.g. displacement sensors, flowmeters, strength gauges, etc.

The gas volumes for the top gas spring $V_{tair}$, and the bottom gas spring $V_{bair}$ change as a function of the instantaneous hydraulic fluid pressures $p_t$ and $p_b$ respectively, as in the following equations:

$$V_{tair}(p_t) = V_{to}\left(\frac{Po}{p_t}\right)^{1/\gamma} \quad (1)$$

$$V_{bair}(p_b) = V_{bo}\left(\frac{Po}{p_b}\right)^{1/\gamma} \quad (2)$$

where $V_{to}$ and $V_{bo}$ are initial gas volumes for pre-charge pressure Po and γ is the adiabatic gas index (1 for ideal gas, 1.4 for adiabatic process). The resultant spring rates $K_{tair}$ for the top gas spring and $K_{bair}$ for the bottom gas spring are $$K_{tair}(p_t) = \frac{\gamma A_{pt}^2}{V_{tair}(p_t)} p_t \quad (3)$$

$$K_{bair}(p_b) = \frac{\gamma A_{pb}^2}{V_{bair}(p_b)} p_b \quad (4)$$

where $A_{pt}$ is the top effective piston area and $A_{pb}$ is the bottom effective piston area.

The diameter of the upper portion 205 of the piston rod can be selected to be smaller than the diameter of the lower portion 204 thereof so that when the upper and lower chamber pressures are equal, the resulting net hydraulic force compensates for the weight of the reaction mass 203. If the upper and lower chambers on average have about the same pressure, there is less leakage between the bore and piston 234.

For a pressure $P_b$ in the lower chamber, a differential pressure $P_{tb}$ to offset the weight $W_m$ of the reaction mass ($W_m = gM_r$ where g is the gravitational acceleration) is $$P_{tb}(P_b) = \frac{W_m + P_b(A_{pb} - A_{pt})}{A_{pt}}. \quad (5)$$

Assuming that the top and bottom chamber average pressures are selected to offset $W_m$, the natural frequency $F_n$ (Hz) of the bottom and top gas springs combined as a function of the bottom chamber's pressure $P_b$ is $$F_n = (1/2\pi) \sqrt{\frac{K_{tair}(P_b + P_{tb}(P_b)) + K_{bair}(P_b)}{Mr}}. \quad (6)$$

Controller 225 is configured to use equations (3) and (4) for determining the spring rates $K_{tair}$ for the top gas spring and $K_{bair}$ for the bottom gas spring. Based on these values, the controller then uses equation (6) to calculate the natural frequency of the reaction mass. When the natural frequency of the reaction mass differs from the actuation frequency of the reaction mass, the controller adjusts the pressure inside the top and bottom chambers to achieve a natural frequency that tracks the actuating frequency.

Figure 3:
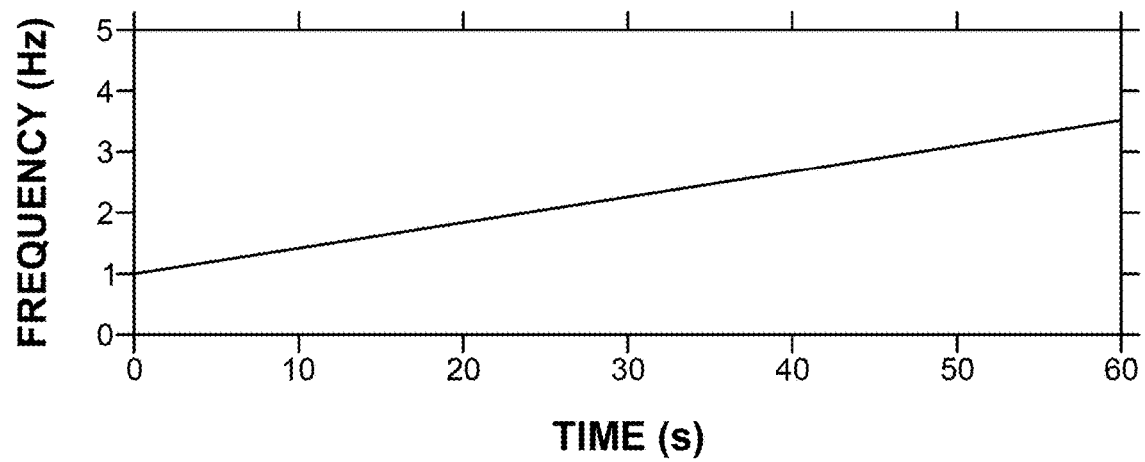
FIG. 3 is a frequency versus time graph illustrating a planned sweep.

A sine wave signal is the most common reference signal used by vibratory sources in seismic surveys. Sweeps have frequency versus time profiles. A linear sweep means that the sweep frequency versus time profile is a line (i.e., there is a linear relationship between frequency and time), which implies the sweep rate (time derivative of frequency) is a constant. FIG. 3 shows a frequency versus time graph for a linear sweep lasting 60 s with frequency rising from 1 to 3.5 Hz. In nonlinear sweeps, the sweep rate varies. For example, in a low-dwell up-sweep, for the very low frequency range of the sweep (typically from 1 Hz up to 5 Hz) the sweep rate increases as a function of frequency to create a frequency versus time profile that has a convex curvature.

Controller 225 may include a processor 240 that in fact can perform the calculations discussed above. The vibrations injected into the explored underground formation may be sinusoidal and may have a continuous or discretely varying frequency. The controller (which may be seen as part of the FAS) controls the valves and so as the natural frequency to track the planned frequency versus time profile, thereby improving the energy efficiency of the vibrator. The controller may calculate average fluid pressure required to attain and maintain the resonance for the actuating frequencies. In one embodiment, the processor interpolates between pre-calculated average fluid pressure values corresponding to certain actuating frequency values.

Figure 4:
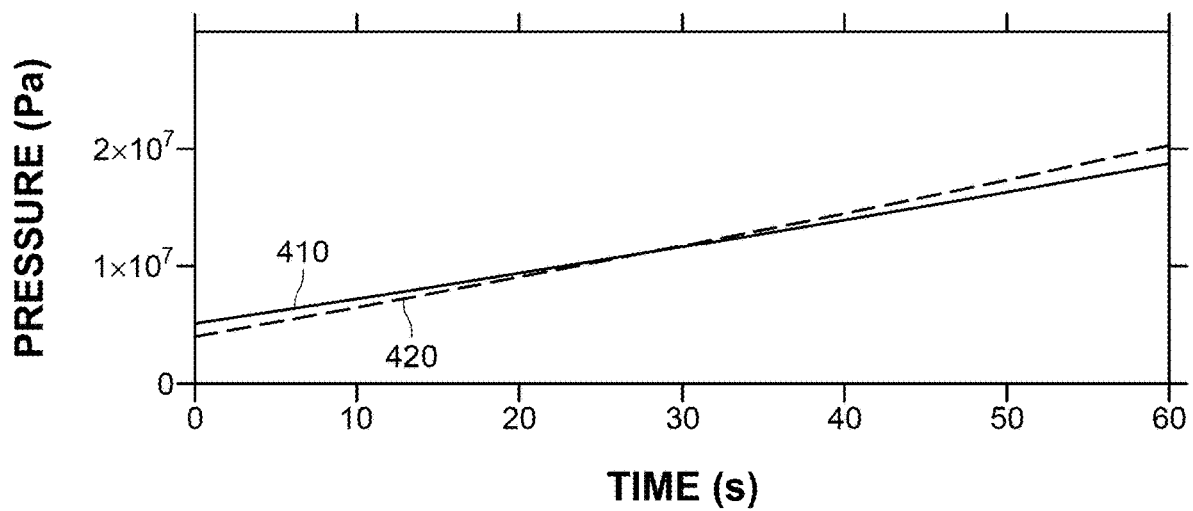
FIG. 4 is a graph illustrating average fluid pressures versus time necessary for the sweep in FIG. 3.

FIG. 4 is a graph of calculated average fluid pressure values (continuous line 410 representing $p_t$ and dashed line 420 representing pb) required to track the sweep profile in FIG. 3 (the calculation assuming that valves 215 and 216 are open to create a larger gas volume of the gas springs, causing lower spring rates). Note that since a rather large gas volume is needed to create a natural frequency at 1 Hz, both valves 215 and 216 are open during a 1-3.5 Hz sweep, the gas springs thus including the gas volumes in accumulators 217 and 218. For a 3-10 Hz sweep, since a smaller gas volume is required, valves 215 and 216 are closed, only the gas volumes in accumulators 209 and 210 being used. Ground force is the dynamic component of the contact force (as opposed to the static hold force) applied to the earth's surface by baseplate 201.

In one embodiment, the FAS is configured as a closed-loop feedback system. Pressure sensors 211s and 212s measure fluid pressure in fluid lines 211 and 212. Accelerometers may be attached to driven structure 202 and/or to reaction mass 203 for estimating the vibrator ground force output. A position sensor, for example a Linear Variable Differential Transformer (LVDT), may be attached between reaction mass 203 and/or to structure 202 for measuring the positions thereof the reaction mass relative to an equilibrium position. In addition, servo-valve 206 may include a 3-stage valve equipped with an electrical torque motor that converts a small electrical current into a small hydraulic flow that is hydraulically amplified to drive a spool of servo-valve 206 in the above-described manner (i.e., switching between positive and negative position). The spool of valve 206 may also be equipped with an LVDT measuring the spool position relative to a null/closed position in-between the positive position and the negative position. In one embodiment, valves 213 and 214 are proportional valves, equipped with position sensors to detect their spool positions as well. In another embodiment, valves 213 and 214 are solenoid valves, equipped with other relevant-information-providing sensors. Temperature sensors may be present to monitor the working fluid's temperature and/or gas temperature. Transducers (e.g., measuring force or pressure) may measure excitation forces inside cylinders 207 and 208. The results of the measurements performed by some or all of the sensors described in this paragraph are fed as information 226 to controller 225.

Controller 225 may include signal conditioning circuits 242 for converting control output signals into device control signals 227 compatible for activating valves 206 and 213-216. Valves 215 and 216 may be open only if actuation frequency is below a certain frequency, for example, open for a range of about 1-3.5 Hz to create a larger gas volume useful for producing low spring rates. For operation at frequencies of about 3-10 Hz, controller 225 closes valves 215 and 216 so that only accumulators 209 and 210 remain active. Accumulators 209 and 210 may have about 10 to 20% (e.g., $\frac{1}{6}^{th}$ or $\frac{1}{7}^{th}$) the volume of accumulators 217 and 218. Using a reduced volume of gas helps to create a higher spring rate using lower gas pressure. Closing or opening of valves 214 and 215 is expected to occur before a low-frequency vibrator sweep starts.

Returning to a VRV that sweeps following the frequency versus time profile shown in FIG. 3, the fluid in chambers 223 and 224 is compressed or decompressed as the reaction mass oscillates (i.e., moves up and down). The oscillating pressure measurements received from sensors 211S and 212S may be filtered (thus, averaged) by controller 225 and compared with a target pressures to generate control signals directing the operation of valves 213 and 214 during the sweep. A filter may be used to remove ripples of the pressure measurements. Different filter options may be used; for example, a model-based predictive filter that uses other sensor signals (e.g., reaction mass position, velocity or acceleration) as model inputs to improve the fluid pressure measurements and/or to improve tracking performance, a moving average filter, a low pass filter, etc. In one embodiment, the pressure control loop itself can be designed to have low bandwidth to reject the pressure ripples.

Figure 5:
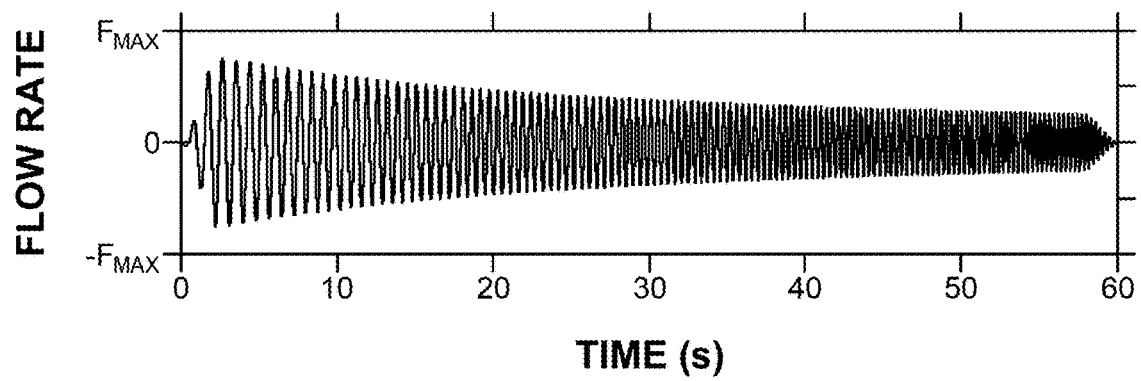
FIG. 5 is a graph illustrating a servo-valve flow rate versus time for the sweep in FIG. 3.
Figure 6:
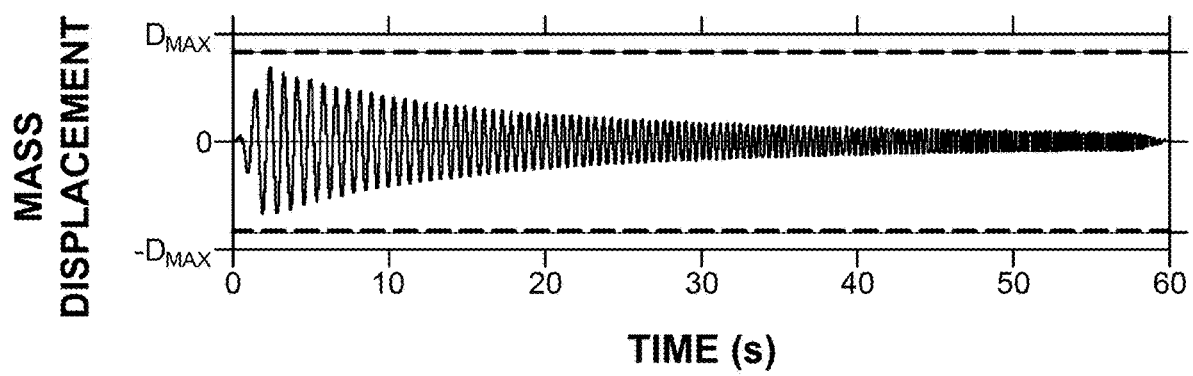
FIG. 6 is a graph illustrating a reaction mass's displacement versus time for the sweep in FIG. 3.
Figure 7:
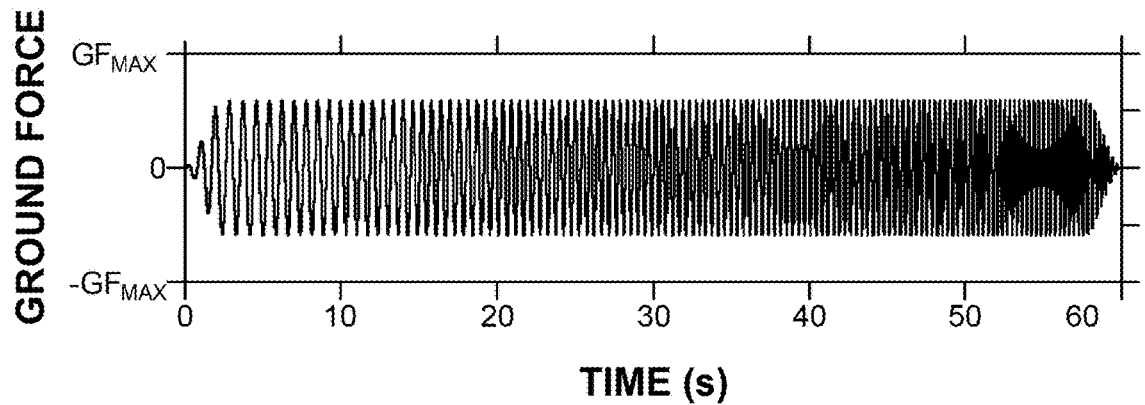
FIG. 7 is a graph illustrating ground force versus time for the sweep in FIG. 3.

FIG. 5 is a graph of the combined flow rates through valve 206 into the upper chambers of hydraulic actuators 207 and 208. The maximum peak flow rate during the sweep occurs 2 s into the sweep time. FIG. 6 is a graph representing reaction mass 203's displacement relative to its center position as a function of time during the sweep. The upper and lower dashed lines mark the range of useable stroke (e.g., $\pm D_{MAX} = \pm 0.5$ m). The resultant ground force (GF) applied to the surface of the earth oscillates (substantially sinusoidal) with a constant peak force, e.g. of $120 \times 10^3$ N, throughout the sweep with some amplitude ramping up and down for some 1-3 s at the start and end of the sweep as illustrated in the graph in FIG. 7. Other target ground force amplitude profiles are possible. For example, the ground force amplitude generated at frequencies where the device is not stroke-limited may be increased.

Figure 8:
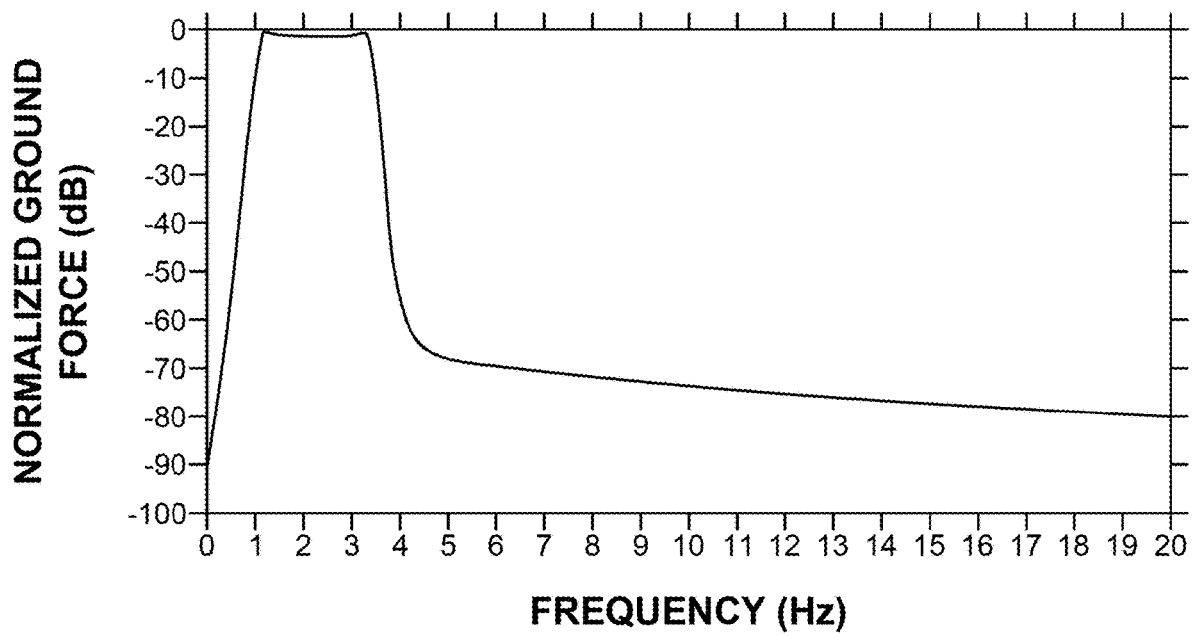
FIG. 8 is a graph illustrating normalized force spectrum (in dB) for the sweep in FIG. 3.

FIG. 8 is a graph illustrating the resultant normalized amplitude spectrum (in dB). Note that in the 1-3.5 Hz range where the FAS makes the natural frequency track the actuation frequency, the energy within the sweep range is high with unwanted energy (for example due to harmonic distortion) 60 dB lower.

Figure 9:
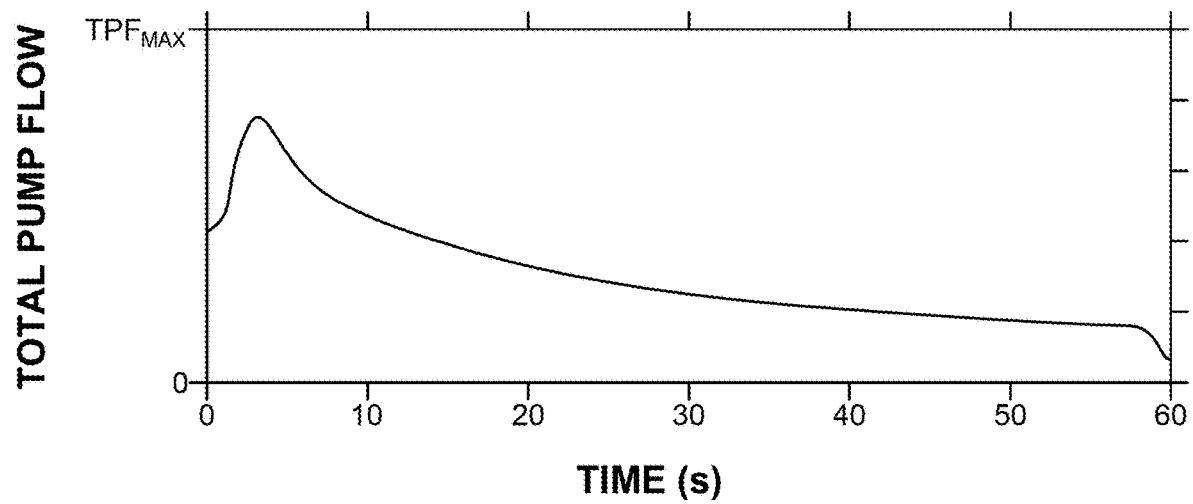
FIG. 9 is a graph illustrating the total hydraulic pump output flow versus time for the sweep in FIG. 3.

FIG. 9 is a graph of the estimated total amount of high-pressure fluid that needs to be supplied by pump 228 to operate a VRV with a structure similar to VRV 200 according to the sweep in FIG. 3. The pump flow (upper limited by $TPF_{MAX}$) includes the flow delivered to valve 206 and used by actuators 207 and 208 as well as the fluid injected into accumulators 209, 210, 217 and 218 for varying the top and bottom spring rates so as the natural frequency to track the planned sweep. If the sweep lasts longer, the peak power demand is less because as the rate of change in frequency decreases, the peak fluid flow delivered to the gas accumulators is reduced. Maintaining resonance (i.e., the natural frequency being equal to the actuation frequency) is challenging when the targeted actuation frequency also changes. In such dynamic conditions, the natural frequency being substantially equal (i.e., within 5-10% off a targeted value) to the actuation frequency is a satisfactory operation manner as the energy transfer efficiency remains high. If discrete (single) frequencies are used instead of sweeps, then during operation the pump load is substantially reduced because no fluid is needed to change the gas spring rate (except perhaps for some small amount to compensate for internal leakage), the fluid being supplied only to valve 206.

Figure 10:
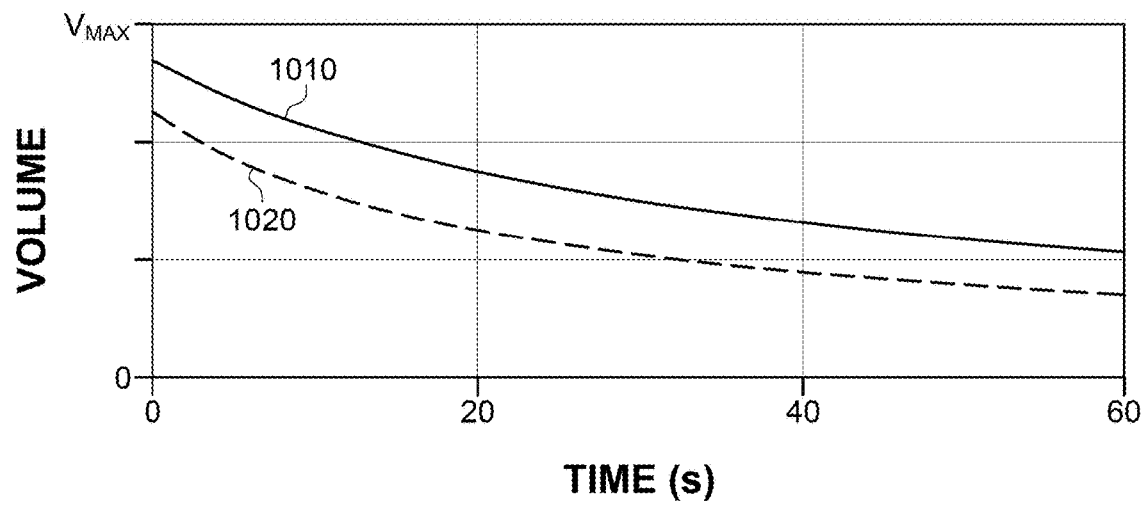
FIG. 10 is a graph illustrating instantaneous gas volume of the gas spring versus time for the sweep in FIG. 3.
Figure 11:
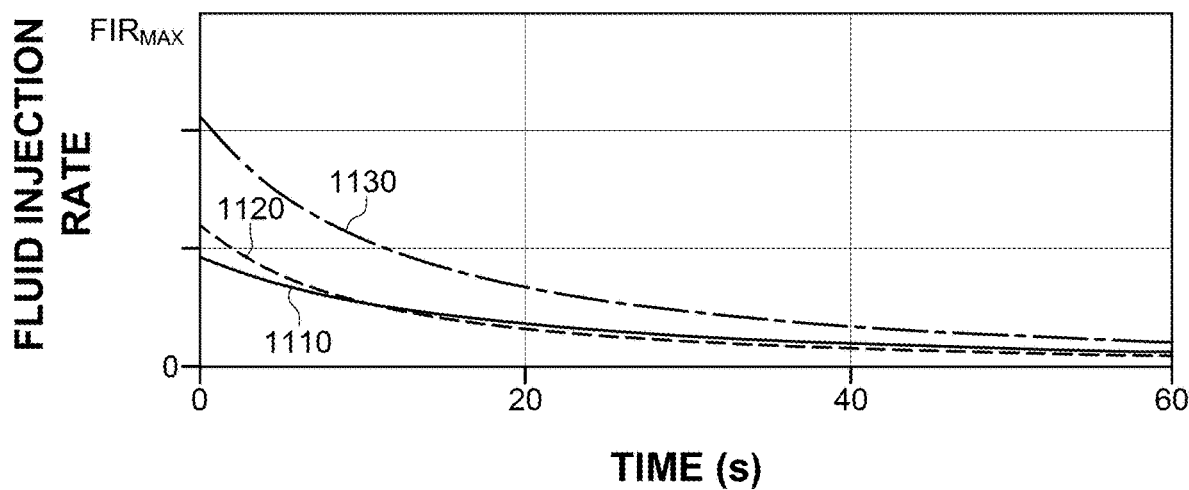
FIG. 11 is a graph illustrating fluid injection rates versus time for the sweep in FIG. 3.

FIG. 10 is a graph illustrating an instantaneous gas volume of the top gas spring (curve 1010) and the bottom gas spring (curve 1020) versus time according to the simulation for the sweep in FIG. 3. FIG. 11 is a graph illustrating the evolutions of a top fluid injection rate 1110 (i.e., into hose 211), a bottom fluid injection rate 1120 (i.e., into hose 212) and a total fluid injection rate 1130 (i.e., the sum of 1110 and 1120) for the sweep in FIG. 3.

The fluid injection rate is directly related to how quickly the gas volume is reduced. For example, if a low-dwell nonlinear sweep designed to accumulate energy at low frequency is used instead of a linear sweep, the peak pump demand is reduced because the rate of change in frequency over the frequency range is lowest where the rate of change in gas volume with frequency is greatest.

FIG. 12 illustrates a VRV 1200 according to another embodiment. Similar to the VRV in FIG. 2, VRV 1200 has a driven structure 1202 with a baseplate 1201. Baseplate 1201 is in contact with earth surface 1222. The reaction mass 1203 has a cylindrical cavity split by a piston 1234 (connected to baseplate 1201 vis lower rod par 1204) into an upper chamber 1223 and a lower chamber 1224. VRV 1200 has a frequency-adjusting system, FAS, 1250 formed by fluid containing components 1223, 1224, 1209, 1210, 1217, 1218 connected via hoses 1211 and 1212 and valves 1213, 1214, 1215 and 1216 to pressured fluid source 1220 and reservoir 1221. Some elements in FIG. 12 similar to the ones in FIG. 2 are not labeled for simplifying this figure.

In this embodiment, an external spring 1255 (with spring rate K1) is used in addition to the gas springs. Spring 1255 is shown as a coil spring but could be a different type, e.g., air bag, air spring, leaf spring etc. Spring 1255 may offset the weight of reaction mass, so a hydraulic force as in VRV 200 is no longer needed to counter-balance the reaction mass's weight. The effective piston area for the upper and lower chambers can therefore be the same Ap with the same average fluid pressure in upper and lower gas accumulators. The accumulators in communication with upper chamber 1223 can therefore be the same as the ones in communication with the lower chamber 1224. For this embodiment, instead of using actuating hydraulic cylinders (as 207 and 208 in VRV 200) to provide the driving force, an electric motor 1260 (which may be a hydraulic motor) drives a sprocket 1261 (a rotation amplitude δ and a torque Tm) and a chain 1262 attached to the reaction mass. Since the driving force $F_{in}$ (generated by actuator) and the reaction mass's velocity are in phase at resonance, a control system (similar to 225 in FIG. 2 but not shown in FIG. 12) can use a measured phase relationship to adjust the $p_t$ and pb as necessary (for example, to compensate for internal fluid leakage around the piston or for temperature change). In addition, a closed loop feedback may be used to adjust $F_{in}$ so that the VRV's output (i.e., the ground force applied to the earth), follows a planned evolution (e.g., a sweep or a sequence of discrete frequencies).

Figure 13:
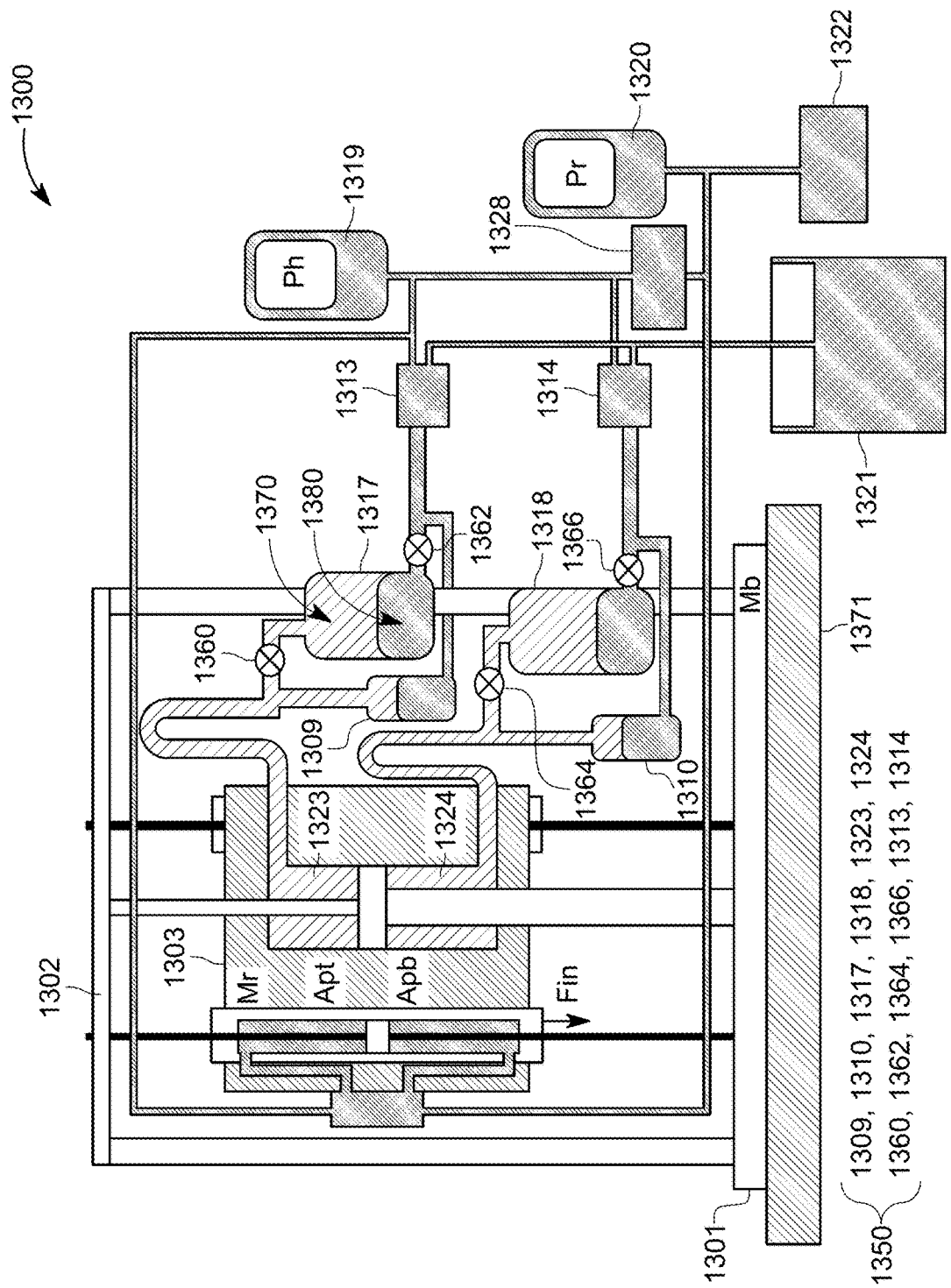
FIG. 13 is a VRV according to yet another embodiment.

FIG. 13 illustrates a VRV 1300 according to yet another embodiment. Similar to the VRVs in FIGS. 2 and 12, VRV 1300 has a driven structure 1302 with a baseplate 1301 in contact with earth surface 1371 and a reaction mass 1303. In this case, a central bore of the reaction mass is filled with gas 1370 and its top and bottom gas springs may be in communication with the gas volumes in accumulators 1309 and 1310 (that are shown outside the reaction mass, but may also be located within reaction mass 103), and if enabled accumulators 1317 and 1318. The accumulators in this embodiment also contain fluid 1380. VRV 1300 has a frequency-adjusting system, FAS, 1350 formed by gas containing chambers 1323, 1324 and gas/fluid accumulators 1309, 1310, 1317 and 1318 connected via hoses and valves 1313 and 1314 to pressured fluid sources 1319 and reservoir 1321. FAS 1350 controls (may also include a controller) gas valves 1360 and 1364 and fluid valves 1362 and 1366 to be open or closed thereby including or not accumulators 1317 and 1318 in the top and bottom gas spring, respectively.

FAS 1350 also controls valves 1313 and 1314 to add or remove fluid in accumulators. Accumulators 1317 and 1318 can each be rendered inactive by closing their respective gas valve (1360 or 1364) and fluid valve (1362 or 1366). The fluid valves may be automatically closed when the gas valves are closed. Similar to VRV 200, high-pressure pump 1328 ensures a high-pressure Ph in accumulator 1319, and low-pressure pump 1322 maintains a lower pressure Pr to pump 1328 and return pressure accumulator 1320.

Figure 14:
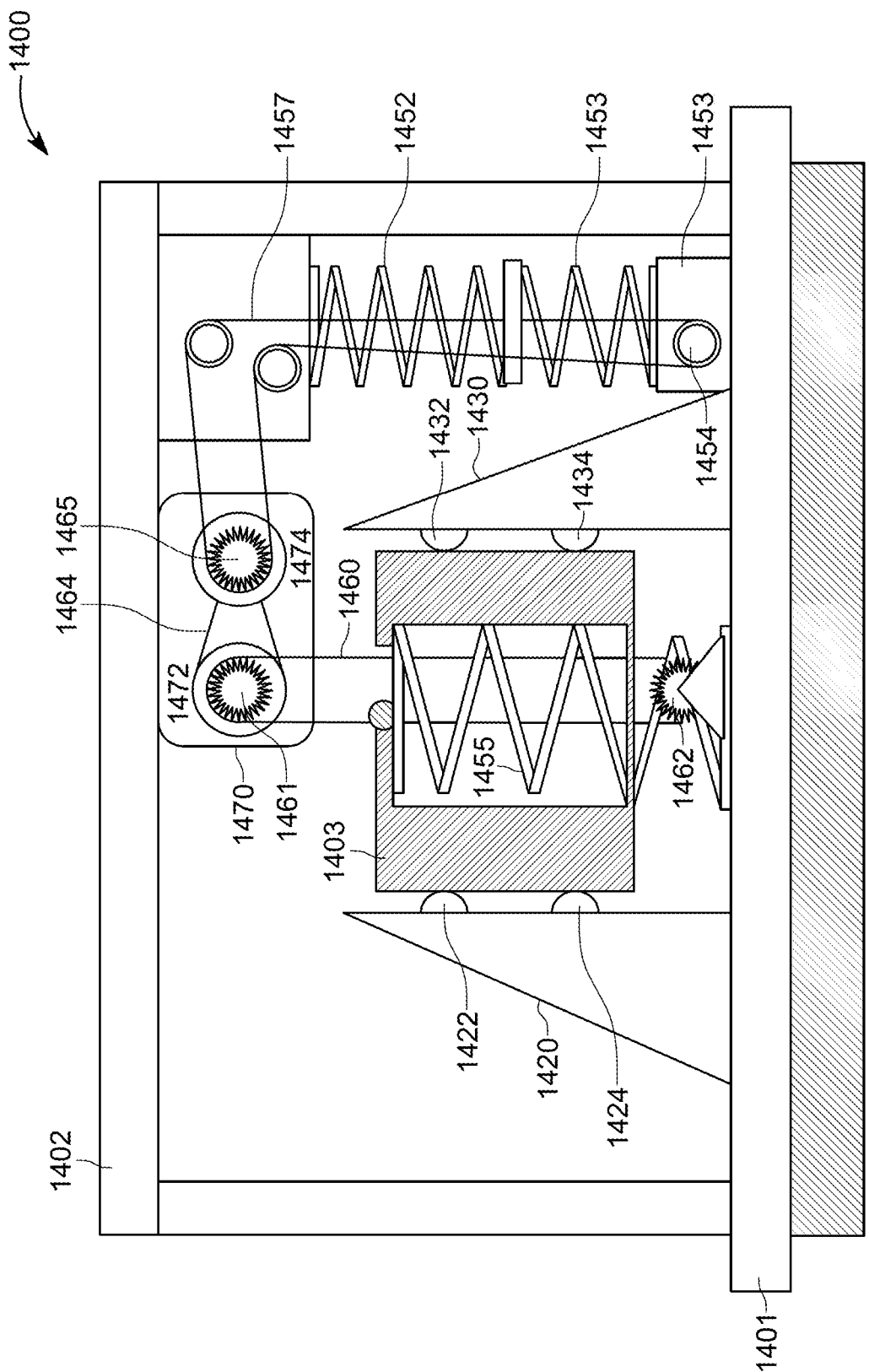
FIG. 14 is a VRV according to another embodiment.

FIG. 14 illustrates a mechanical VRV 1400 according to another embodiment. VRV 1400 includes a reaction mass 1403 elastically coupled to baseplate 1401 (which is part of structure 1402) via springs 1452 and 1453. Reaction mass 1403 is actuated by a mechanical actuator including a chain 1460 and sprockets 1461 and 1462 (the chain being fixedly attached to the reaction mass). The reaction mass oscillates between vertical walls 1420 and 1430 attached on the base plate. Rollers 1422, 1424, 1432 and 1434 substantially lower the friction otherwise occurring between the reaction mass and the walls. Spring 1455 is compressed to counter-balance the weight of the reaction mass. Springs 1452 and 1453 connected to the actuator via a continuously variable transmission, CVT 1470 forming together a FAS 1450 for VRV 1400.

The natural frequency of the reaction mass coupling to the baseplate depends on the reaction mass value m and an equivalent spring rate of springs 1452, 1453 and 1455. An adjusted spring rate $K_a$ of springs 1452 and 1453 is the product of the CVT drive ratio $\beta$ and the sum of spring rates $K_1$ and $K_2$ of springs 1452 and 1453, respectively. CVT 1470 is equipped with two variable diameter V-belt pulleys 1472 and 1474 with a V-belt 1464 running between them. The drive ratio is changed by simultaneously moving the two sheaves of one pulley closer together and the two sheaves of the other pulley farther apart. The V-shaped cross section makes the belt to ride high on one pulley and low on the other, which changes the effective diameters of both pulleys, and thereby the overall drive ratio. As the distance between the pulleys and the length of the belt do not change, both pulleys must be adjusted simultaneously in order to maintain the tension on the belt.

Sprocket 1461, which is on the same axle as pulley 1472 of CVT 1470 is connected to the reaction mass 1403 via chain 1460. The axle is connected to a servomotor (not shown) that provides the excitation force. Another sprocket 1465 (that may have the same diameter as the sprocket 1461 used to drive the mass) is mounted on the axle of pulley 1474 to drive a chain 1457 that connects to springs 1452 and 1453 to the CVT. A couple of chain roller guides and a roller 1454 below spring 1453 enable a closed loop for chain 1457. Controller (not shown) may direct an electric actuator to vary the CVT drive ratio. The controller may synchronize changing the drive ratio with changes in the actuation frequency to operate VRV 1400 at resonance.

FIGS. 2 and 12-14 illustrate the VRVs as p-wave (vertical) vibrators, but the VRVs can be used also as s-wave (horizontal) vibrators.

Figure 15:
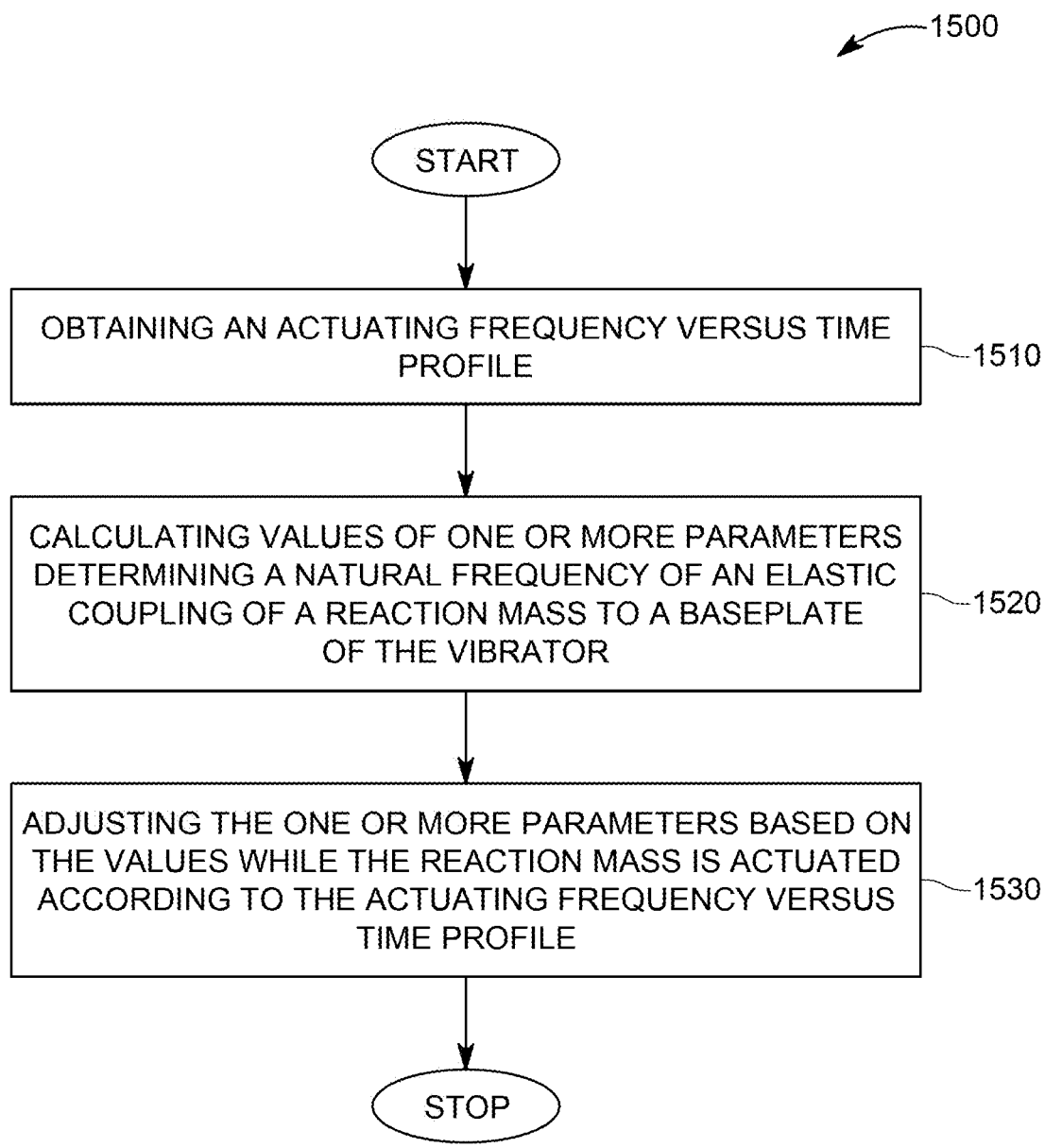
FIG. 15 is a flowchart of a method of efficiently operating a vibrator at low frequencies according to an embodiment.

FIG. 15 illustrates a flowchart of a method 1500 of efficiently operating a vibrator according to an embodiment. Method 1500 includes obtaining a frequency versus time profile at 1510. The method then includes, at 1520, computing parameter values for adjusting a spring rate of an elastic coupling mechanism between a resonance mass and a baseplate of the vibrator so that a natural frequency of the elastic coupling mechanism and the reaction mass to substantially match the actuation frequency according to the frequency versus time profile. In case of the embodiments in FIGS. 2, 12 and 13, the target parameters are pressures of the gas springs ($p_t$ and $p_b$) and in case of the embodiment in FIG. 14 it is the CVT drive ratio.

Method 1500 then includes controlling a frequency-adjusting system to attain the parameter values during a sweep following the frequency versus time profile at 1530. Step 1530 may include first adjusting the elastic coupling mechanism so that the natural frequency substantially matches a start frequency of the frequency versus time profile. Then, as the reaction mass is actuated at different frequency values, the elastic coupling mechanism's spring rate is modified (e.g., by changing the pressures and/or enabling/disabling additional accumulators). Optionally, a feedback loop may be used to fine tune the parameters (e.g., based on measurements provided by sensors like pressure sensors 211s and 212s in FIG. 2).

Method 1500 also includes adjusting the one or more parameters according to the calculated values while the reaction mass is actuated according to the actuating frequency versus time profile at 1530. The vibrator thus operates at or close to resonance during the sweep. Here, substantially matching means within 10% of the predetermined frequency value. A feedback loop may ensure fine tuning to get as close as possible to the predetermined frequency value.

The natural frequency may be adjusted hydraulically (as in embodiments 200, 1200 and 1300) by changing pressure and/or volume of a gas spring connecting the reaction mass to the baseplate. The natural frequency may be adjusted mechanically (as in embodiment 1400). The frequency versus time profile may be a linear, low-dwell or nonlinear sweep for a range of frequencies lower than 5 Hz.

The disclosed embodiments provide variable resonance vibrators (and associated methods) that adjust natural frequency of an elastic coupling mechanism and the reaction mass coupled to the baseplate so that the natural frequency be substantially equal to an actuating frequency applied to the reaction mass. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims

What is claimed is:

1. A seismic vibrator configured to be operated at or close to resonance for a range of actuation frequencies, comprising:
   a baseplate;
   a reaction mass coupled to the baseplate via an elastic coupling mechanism, which includes a top chamber and a bottom chamber formed inside a first cavity of the reaction mass, and a first piston configured to slide inside the first cavity and separating the top chamber from the bottom chamber, which is below the top chamber;
   an actuator configured to displace the reaction mass with an actuating frequency, the actuator including a top chamber and a bottom chamber formed inside a second cavity of the reaction mass, and a second piston configured to slide inside the second cavity and separating the top chamber from the bottom chamber; and
   a frequency-adjusting system, FAS, configured to adjust a natural frequency of the elastic coupling mechanism and the reaction mass, by modifying a pressure and/or a volume of at least one of the top chamber and the bottom chamber of the elastic coupling mechanism, so that the adjusted natural frequency tracks the actuating frequency.

2. The seismic vibrator of claim 1, wherein the FAS comprises:
   a controller configured
   to calculate one or more values of the pressure and/or the volume determining the natural frequency to match actuating frequency values in an actuating frequency versus time profile, and
   to send a command for changing the pressure and/or the volume according to the calculated one or more values as the actuating frequency changes according to the actuating frequency versus time profile.

3. The seismic vibrator of claim 2, further comprising:
   at least one sensor configured and placed to measure a current value of the pressure and/or the volume that determines the natural frequency and to provide the current value to the controller,
   wherein the controller adjusts the calculated values according to the current value.

4. The seismic vibrator of claim 2, wherein the elastic coupling mechanism comprises:
   the pressure and/or the volume are one or more of pressures and gas volumes in fluid communication with the top chamber and/or with the bottom chamber of the elastic coupling mechanism.

5. The seismic vibrator of claim 4, wherein the FAS comprises:
   one or more valves and accumulators associated with the top chamber and/or the bottom chamber of the elastic coupling mechanism, the one or more valves and accumulators enabling control of the pressure and/or the volume.

6. The seismic vibrator of claim 4, further comprising:
   at least one pressure sensor in fluid communication with the top chamber or/and the bottom chamber of the elastic coupling mechanism and configured to measure instantaneous pressure values that are fed to the controller.

7. The seismic vibrator of claim 1, wherein the elastic coupling mechanism further comprises:
   a rod that passes vertically through the piston and is fixedly attached to the baseplate, the rod having a first cross-sectional area in the top chamber smaller than a second cross-sectional area in the bottom chamber so that a difference of forces exerted for a same pressure, in the first and the second chambers of the elastic coupling mechanism, counter-balances a weight of the reaction mass.

8. The seismic vibrator of claim 7, wherein the natural frequency of the reaction mass depends on gas volumes in communication with the top and the bottom chambers of the elastic coupling mechanism, the first and the second cross-sectional areas, a mass value of the reaction mass, and pressures of the top chamber and of the bottom chamber of the elastic coupling mechanism.

9. The seismic vibrator of claim 5, wherein the accumulators are placed inside the reaction mass.

10. The seismic vibrator of claim 5, wherein at least one of the accumulators contains both gas and liquid, the at least one accumulator having:
    a gas valve connecting a gas volume to the top chamber or to the bottom chamber of the elastic coupling mechanism, and
    a pressure-supply valve connecting a liquid volume in the at least one accumulator to a pressurized liquid reservoir.

11. A seismic vibrator configured to be operated at or close to resonance, the seismic vibrator comprising:
    a baseplate;
    a reaction mass coupled to the baseplate via an elastic coupling mechanism that includes springs fixedly attached to the baseplate; and
    a frequency-adjusting system, FAS, that includes a continuously variable transmission, CVT, connected to at least one of the springs, the FAS being configured to change an equivalent spring rate of the springs by changing a CVT's drive ratio to make a natural frequency of the elastic coupling mechanism match an actuating frequency of the reaction mass.

12. The seismic vibrator of claim 1, wherein the actuator is a hydraulic actuator that generates a force to move the reaction mass with the actuating frequency.

13. The seismic vibrator of claim 1, wherein the actuating frequency tracks a predetermined sweep, which is a frequency versus time profile.

14. The seismic vibrator of claim 13, wherein, at frequencies lower than 5 Hz, the frequency versus time profile is a line.

15. A frequency-adjusting system, FAS, configured to adjust a natural frequency of an elastic coupling mechanism and a reaction mass coupled to a baseplate, the elastic coupling mechanism including a top chamber and a bottom chamber formed inside a cavity of the reaction mass, wherein the top chamber is separated by the bottom chamber by a piston, the FAS comprising:
    a controller configured to calculate pressure and/or gas volume values of the top chamber and of the bottom chamber, the calculated pressure and/or volume values corresponding to target values needed to realize a desired natural frequency;
    accumulators and valves receiving commands from the controller to independently achieve the calculated pressure and/or volume values in the top chamber and the bottom chamber, and
    an actuator configured to displace the reaction mass with an actuating frequency, the actuator including a top chamber and a bottom chamber formed inside a second cavity of the reaction mass, and a second piston configured to slide inside the second cavity and separating the top chamber from the bottom chamber, wherein the controller outputs the commands causing instantaneous pressures and volumes of the top chamber and of the bottom chamber to have the calculated pressure and volume values thereby making the natural frequency to be substantially equal to an actuation frequency applied to the reaction mass.

16. A method of operating a vibrator having a reaction mass attached to a baseplate via an elastic coupling mechanism including a top chamber and a bottom chamber formed inside a cavity of the reaction mass, a piston configured to slide inside the cavity separating the top chamber from the bottom chamber, which is below the top chamber, the method comprising:

obtaining an actuating frequency versus time profile;

independently calculating values of one or more pressure and/or volume in the top chamber and the bottom chamber determining a natural frequency of the elastic coupling mechanism and the reaction mass so that the natural frequency matches frequency values of the actuating frequency in the actuating frequency versus time profile;

displacing with an actuator the reaction mass with an actuating frequency, the actuator including a top chamber and a bottom chamber formed inside a second cavity of the reaction mass, and a second piston configured to slide inside the second cavity and separating the top chamber from the bottom chamber; and adjusting the one or more of the pressure and/or volume in the top chamber and/or the bottom chamber using the calculated values while the reaction mass is actuated according to the actuating frequency versus time profile.

17. The method of claim 16, wherein the natural frequency is adjusted hydraulically only.

18. The method of claim 16, wherein, at frequencies lower than 5 Hz, the frequency versus time profile is a line.

* * * * *